United States Patent [19]

Wake

[11] Patent Number: 4,577,894
[45] Date of Patent: Mar. 25, 1986

[54] AXIAL COMPRESSION HOSE COUPLING

[76] Inventor: Harold E. Wake, 915 E. South Strathmore Ave., Lindsay, Calif. 93247

[21] Appl. No.: 519,083

[22] Filed: Aug. 1, 1983

[51] Int. Cl.$^4$ ............................................. F16L 33/02
[52] U.S. Cl. .................................. 285/242; 285/250; 285/255; 285/395
[58] Field of Search ............... 285/242, 255, 250, 423, 285/394, 359, 395

[56] References Cited

U.S. PATENT DOCUMENTS

| | | | |
|---|---|---|---|
| 1,802,499 | 4/1931 | Chapman | 285/255 |
| 3,361,449 | 1/1968 | Parro | 285/255 |
| 4,278,279 | 7/1981 | Zimmerman | 285/255 |

FOREIGN PATENT DOCUMENTS

| | | | |
|---|---|---|---|
| 1525854 | 1/1970 | Fed. Rep. of Germany | 285/255 |
| 2546230 | 4/1976 | Fed. Rep. of Germany | 285/242 |
| 0542805 | 8/1922 | France | 285/255 |
| 1361844 | 4/1964 | France | 285/242 |

Primary Examiner—Cornelius J. Husar
Assistant Examiner—Eric K. Nicholson

[57] ABSTRACT

A coupling mechanism for use with flexible hose or tubing in which axial compression forces are applied to the end of the hose or tubing in order to provide the coupling action. The coupling mechanism includes a nipple having a head at the free end thereof surrounded by a collar having an inwardly extending abutment member at the opposite end thereof from the free end of the nipple. The end of the flexible hose or tube is received over the nipple and within the collar with a close fit. Upon axial movement of the collar with respect to the nipple toward the free end thereof, the abutment member on the collar will apply axial compression force to the end of the hose or tubing causing the wall at the end of the hose or tubing to expand into sealing and gripping relation with the nipple and collar. Means for forcing the collar to move axially of the nipple upon rotation of the collar and to selectively maintain the collar at a given point in the axial movement thereof are provided.

10 Claims, 8 Drawing Figures

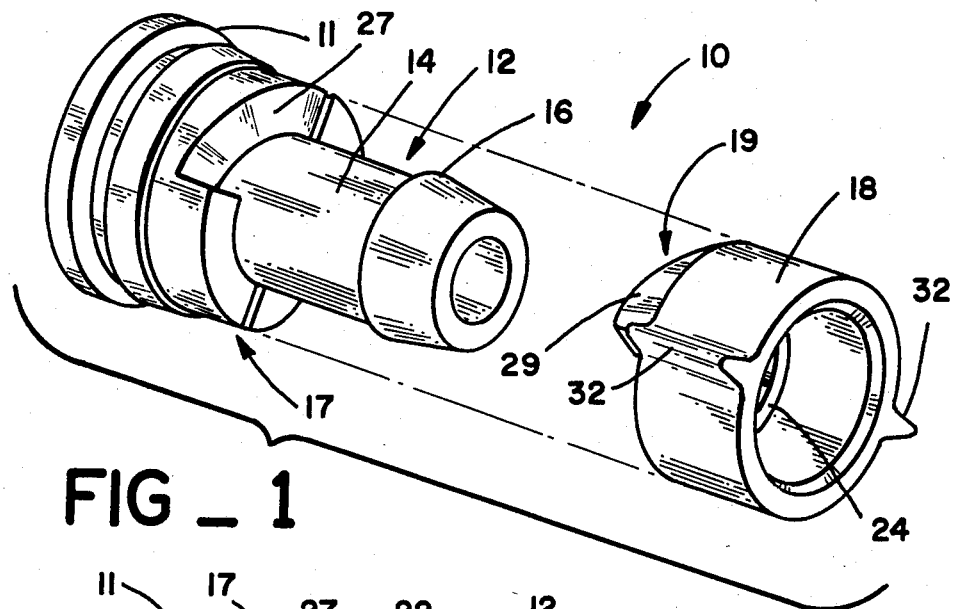
FIG_1
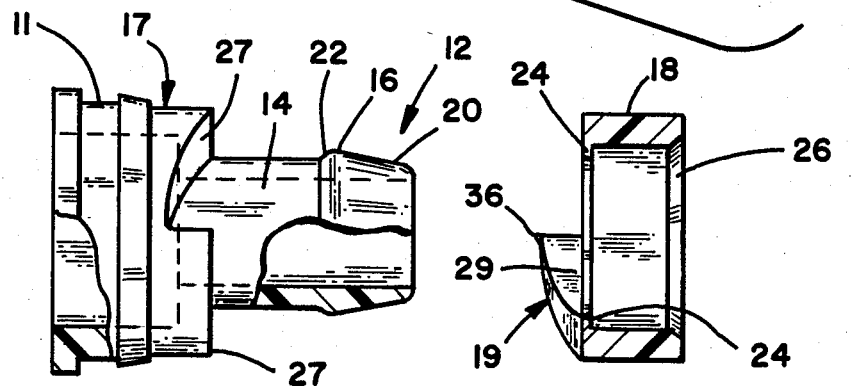
FIG_2  FIG_3
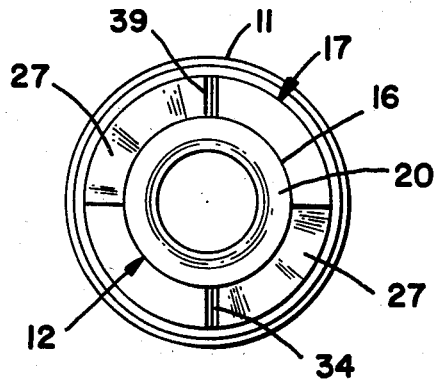
FIG_4
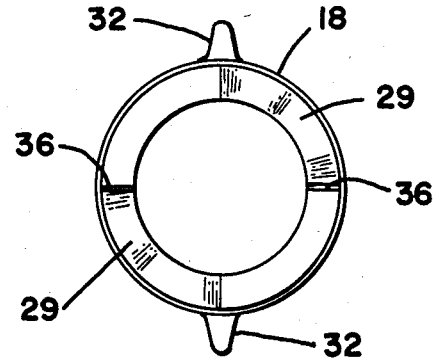
FIG_5

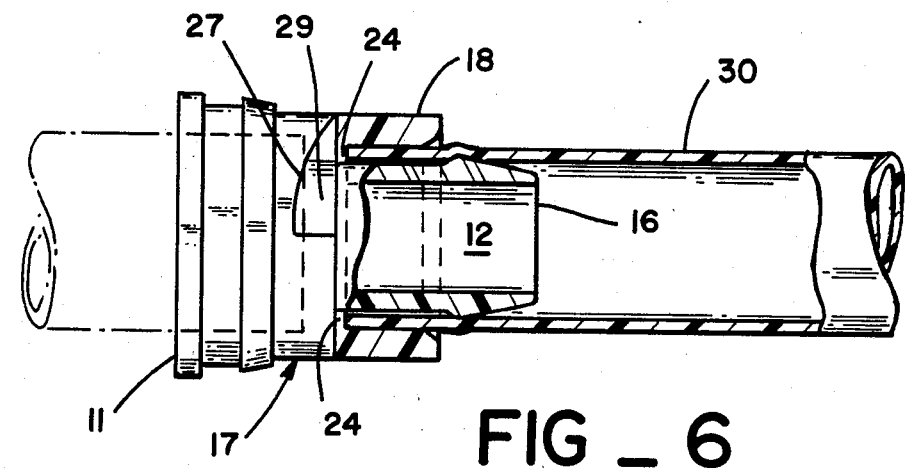
FIG_6
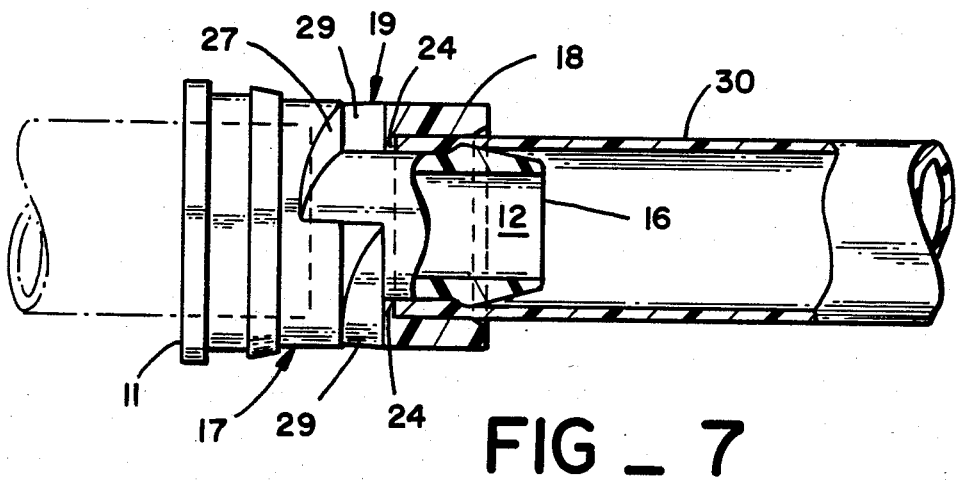
FIG_7
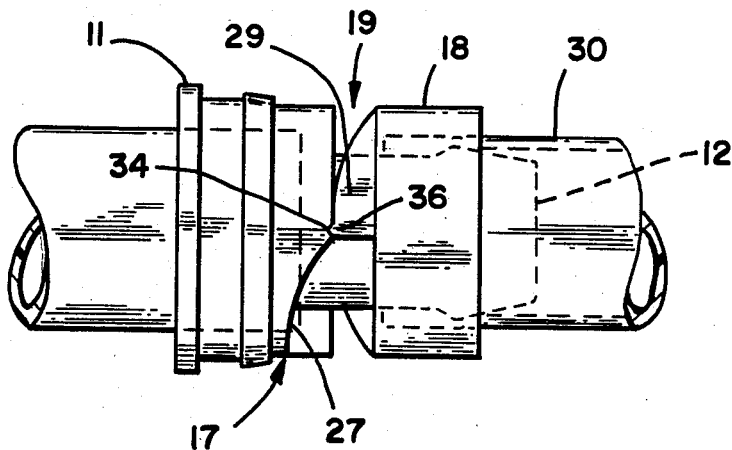
FIG_8

AXIAL COMPRESSION HOSE COUPLING

FIELD OF THE INVENTION

This invention relates to a coupling mechanism for removably mounting and sealing a flexible hose to a rigid pipe or nipple and more particularly to such a coupling mechanism in which the mounting and sealing is accomplished by applying axial compression forces to the end wall of the hose about the nipple.

BACKGROUND OF THE INVENTION

It is well known in the prior art to attach flexible hoses to each other, to rigid pipes or cavities or to various rigid fittings by means of rigid nipples which are received within the ends of the hoses. Such a nipple usually has an exterior diameter substantially equal to the inner diameter of the hose and is provided with a head tapering from an exterior diameter at the free end thereof which is smaller than the inner diameter of the hose to a diameter larger than the exterior diameter of the remainder of the nipple and then back to the normal diameter of the nipple. However, it is not possible to provide a reliable fluid tight seal between the hose and the nipple solely by means of an interference fit between the hose and the head of the nipple and an attempt to do so will tend to make it impossible to insert the nipple into the hose.

Thus, in the prior art it is common practice to use a modest interference fit between the head of the nipple and the hose and to apply a hose clamp about the exterior surface of the end of the flexible hose after the nipple is inserted therein. A hose clamp by definition is adapted to apply circumferential compressive torces to the exterior surface of the hose in order to force the interior surface of the hose into sealing contact with the nipple. The hose clamp is usually applied to the hose in the region between the free end of the hose and that portion of the hose which contains the head of the nipple in order to prevent the nipple from slipping out of the hose.

Thus, a hose clamp must be capable of having its inner circumference adjusted from a diameter at least as large as the exterior diameter of the hose, for ease of application, to a diameter smaller than the exterior diameter of the hose in order to provide the circumferential compression forces necessary to produce the desired sealing and mounting effects. Such circumferential adjustment is mechanically difficult to accomplish and requires either manual dexterity in the case of spring type clamps or expensive mechanical structure in the case of rigid type clamps, such as screws, bolts or gear elements, depending on the particular hose clamp design.

More recently, it has been proposed to use hose clamps in the form of rigid collars having an internal circumference which is tapered from a diameter larger than the exterior diameter of the hose to a diameter smaller than the exterior diameter of the hose and move the collar axially of the hose in order to exert circumferential compressive forces on the exterior of the hose in an attempt to secure and seal the hose on the nipple. U.S. Pat. No. 3,361,449 issued Jan. 2, 1968 to Parro and U.S. Pat. No. 4,278,279 issued July 14, 1981 to Zimmerman are representative of this type of hose coupling mechanism.

However, according to the teaching of Parro, the entire free end portion of the hose is involved in the coupling mechanism requiring an extended taper on the nipple head and distributing the compressive forces over a large area. Thus, very high forces are required to accomplish the seal and the assembly of the hose, nipple and collar, is complicated since the hose must be forced axially into the tapered collar prior to or during the coupling action. According to the teaching of Zimmerman, the assembly of the hose, nipple and collar is facilitated by making the amount of taper of the collar relatively small, but this is done at the sacrifice of the sealing and mounting effects of the Zimmerman coupling mechanism. It will be noted that according to the teaching of Zimmerman, the frictional gripping forces exerted by his tapered coupling collar are such that the nipple may be manually pulled out of the hose without releasing the circumferential compressive force of the collar from the hose.

It is the object of this invention to overcome the above difficiencies of the prior art by providing a hose coupling mechanism which is effected by the application of compressive forces exerted axially of the hose.

BRIEF SUMMARY OF THE INVENTION

According to the coupling mechanism of this invention a flexible hose is sealed and rigidly fixed to a right circular cylindrical nipple of conventional design known in the art by means of a right circular cylindrical collar of rigid material surrounding the nipple. The collar has an interior diameter substantially equal to the exterior diameter of the hose and an axial length shorter than the axial length of the nipple. The collar according to this invention has an inwardly extending abutment member on the opposite end thereof from the head of the nipple. The abutment member extends inwardly a distance which is a substantial portion of the wall thickness of the hose and means are provided for urging the collar to move axially of the nipple toward the head thereof which means is adapted to selectively maintain the collar at a given point in its movement toward the head of the nipple. Upon axial movement of the collar, the inwardly extending abutment member on the collar applies axial compressive force to the end of the hose causing the side wall of the hose between the head of the nipple and the abutment member of the collar to expand into sealing and gripping contact with the exterior surfaces of the shank and head of the nipple and with the interior surface of the collar.

BRIEF DESCRIPTION OF THE DRAWING

This invention will be more fully understood from a reading of the following detailed description in conjunction with the appended drawing showing a preferred embodiment thereof wherein:

FIG. 1 is an exploded perspective view of a preferred embodiment of coupling mechanism according to this invention.

FIG. 2 is a side view in elevation of the body of FIG. 1 having the nipple to which a hose is to be coupled according to this invention partially broken away to show internal structure thereof in cross-section.

FIG. 3 is a cross-sectional view of the collar of FIG. 1.

FIG. 4 is a right end view of the body and nipple of FIGS. 1 and 2.

FIG. 5 is a left end view of the collar of FIGS. 1 and 3.

FIG. 6 is a side view in elevation of the embodiment of this invention shown in FIG. 1 as fully assembled with a flexible hose prior to actuating the coupling mechanism thereof. FIG. 6 is broken away to show the relationship of the internal structure of the hose, nipple and collar according to this invention in cross-section.

FIG. 7 is a view similar to FIG. 6 but showing the relationship of the body, hose, nipple and collar after actuation of the coupling mechanism according to this invention.

FIG. 8 is a view similar to FIG. 7 but showing all parts in full with certain internal relationships indicated in phantom.

DETAILED DESCRIPTION OF PREFERRED EMBODIMENT

Referring to FIG. 1 an exploded view in perspective of a preferred embodiment 10 of the coupling mechanism according to the teaching of this invention is shown. A representative body 11 to be coupled to a flexible hose is shown by way of example only. It will be understood that the body 11 could take many different forms. For example, the body 11 could be any conventional fitting known in the art for coupling to the end of the hose such as a T-intersection, sprinkler head, male or female screw-type fitting, a fitting for the interconnection of two lengths of hose of the same or different sizes or even a solid plug for closing the end of the hose. The body 11 could also be a large reservoir or container to which a flexible hose is to be connected.

Projecting from the body 11 is a nipple 12 which may be of a conventional design including a shank 14 and a head 16. The particular shape of the head 16 shown in the drawing is preferred according to the teaching of this invention. However, it should be understood that the head 16 could have some other shape so long as it has an exterior diameter larger than the exterior diameter of the shank 14.

A collar 18 according to this invention is shown in perspective in FIG. 1 removed from the nipple 12. It will be understood that the collar 18 would normally be received on the nipple 12 prior to assembly with a flexible hose. According to this invention a means is provided for moving the collar 18 coaxially of the nipple 12 toward the head 16 thereof and for holding the collar 18 at a given point in such movement. Thus, appropriate structural elements 17 are provided on the body 11 or nipple 12 which cooperate with structural elements 19 provided on the collar 18. Such structural elements may be cooperating screw threads as known in the prior art. However, the specific structure 17 and 19 as shown in the drawing is preferred according to the teaching of this invention as will be more fully described hereinafter.

Referring to FIG. 2 the coupling mechanism of this invention is intended for use with conventional flexible hose or tubing made of resilient material and having a substantial wall thickness. Thus, according to the preferred embodiment of this invention, the exterior diameter of the shank 14 is substantially equal to the interior diameter of the hose or tubing to be coupled thereto, the head 16 of the nipple 12 has an exterior diameter that is larger than the exterior diameter of the shank 14. In the preferred embodiment of this invention, the exterior diameter of the head 16 of the nipple 12 would not be larger than the exterior diameter of the hose or tubing to be coupled thereto. However, some departure from the above relationships may be possible depending on the resilience of the material of which the hose or tubing is made and the wall thickness thereof.

According to the preferred embodiment of this invention the nipple 12 is designed to facilitate its insertion into the hose. Thus, the head 16 of the nipple 12 includes an extended surface 20 smoothly tapering from an exterior diameter smaller than the interior diameter of the hose to be coupled thereto at the free end thereof to a maximum diameter and a second surface 22 tapering abruptly back to a junction with the exterior diameter of the shank 14 of the nipple 12.

Referring to FIG. 3 a cross-section of the collar 18 of FIG. 1 is shown. In accordance with this invention the collar 18 is a simple right circular cylinder of rigid material having an internal diameter larger than the maximum external diameter of the head 16 of the nipple 12 by an amount less than the wall thickness of the hose. According to this invention an inwardly extending abutment member 24 is provided at one end of the collar 18. The abutment member 24 projects inwardly into close spaced relation to the shank 14 of the nipple 12. In the preferred embodiment of this invention as shown in the drawing the abutment member 24 defines a complete circular flange about the inner periphery of one end of the collar 18 and has an inner diameter less than the exterior diameter of the head 16 but greater than the exterior diameter of the shank 14 of the nipple 12 by an amount less than the wall thickness of the hose. Thus, the flange 24 of the collar 18 will provide an interference fit with the head 16 of the nipple 12 and when the collar 18 is forced over the head 16 of the nipple 12 the flange 24 will retain the collar 18 loosely on the nipple 12.

The axial length of the collar 18 according to this invention is shorter than the axial length of the shank 14 of the nipple 12. Thus, when the collar 18 is fully received on the nipple 12 the maximum exterior diameter of the head 16 of the nipple 12 will extend clear of the collar 18. The collar 18 is oriented on the nipple 12 so that the flange 24 is located at the end of the collar 18 remote from the head 16 of the nipple 12. The end of the collar 18 adjacent the head 16 of the nipple 12 may be provided with a beveled surface 26 about the inner periphery thereof in order to facilitate the insertion of the end of the hose in the collar 18.

In the preferred embodiment of this invention as shown in drawing, the cooperating means 17 and 19 for moving the collar 18 axially of the nipple 12 comprises a pair of diametrically opposed ratchet cam surfaces 27 disposed about the root of the nipple 12 and a pair of mating diametrically opposed ratchet teeth 29 disposed about the end of the collar 18 bearing the flange 24. The ratchet cam surfaces 27 and ratchet teeth 29 are dimensioned so that 90° of rotation of the collar 18 will cause sufficient movement of the collar 18 along the axis of the nipple 12 to cause the head 16 of the nipple 12 to be received within the collar 18.

Referring to FIGS. 6 and 7 of the drawing the action of the coupling mechanism according to this invention is illustrated. Thus, as shown in FIG. 6 the collar 18 is positioned about the nipple 12 with the ratchet teeth 29 thereof fully received against the ratchet cam surfaces 27 and the flange 24 thereof adjacent the root of the nipple 12. The end of the hose 30 is then pushed over the nipple and into the collar 18 seating against the flange member 24 thereof. It will be seen that the walls of the hose 30 will bulge slightly in passing over the head 16 of the nipple 12 but will return to their normal diameter due to the resilience of the material of which the hose is made in order to pass easily into the collar 18.

As shown in FIG. 7 clockwise rotation of the collar 18 with respect to the nipple 12 will cause the collar 18 to move axially of the nipple 12 due to the engagement of the ratchet teeth 29 thereon with the ratchet cam surfaces 27. As the collar 18 approaches the head 16 of the nipple 12 it will compress the wall of the hose 30 against the head 16 of the nipple 12 tending to prevent axial movement of the hose 30 with respect to the nipple 12. The flange 24 will then apply axial compressive forces to the end of the hose 30 causing the side wall of the hose 30 between the flange 24 and the head 16 of the nipple to expand in thickness. Continued axial movement of the collar 18 with respect to the nipple 12 will trap the expanded portion of the end wall of the hose 30 exerting pressure thereon from all sides to provide a highly effective gripping and sealing action.

Referring to FIG. 8 the anchoring of the hose 30 within the collar 18 is illustrated in phantom to emphasize the fact that according to the teaching of this invention the hose 30 is rigidly fixed to the nipple 12 in addition to being sealed thereto in fluid tight relationship. The hose 30 cannot be manually removed from the nipple 12 without first rotating the collar 18 to orient the ratchet teeth 29 thereon with respect to the ratchet cam surfaces 21 so that the collar may be moved back toward the root of the nipple 12 in order to relieve the axial pressure on the end of the hose 30.

It will be seen that a relatively small amount of rotational movement and a relatively small amount of axial movement of the collar 18 is all that is required to provide a rigid gripping action and an effective fluid tight seal according to the teaching of this invention. In order to facilitate rotational movement of the collar 18 it may be provided with wings or thumb grips 32 as best shown in FIGS. 1 and 5. The mechanical advantage provided by the ratchet cam surface 27 and ratchet teeth 29 enables the production of substantial compressive forces without requiring the exertion of excessive rotational forces on the collar 18. Such high compressive forces will tend to produce frictional forces sufficient to inhibit counter rotation of the collar 18 after the seal has been made.

However, in the preferred embodiment of this invention a detent means is provided to insure that the collar 18 will be maintained in the position into which it is rotated in order to provide the desired sealing and gripping action. Thus, as best shown in FIGS. 3, 4, 5 and 8 a pair of diametrically opposed detent grooves 34 are provided at the operative ends of the ratchet cam surfaces 27 and a pair of diametrically opposed detent ridges 36 are provided at the extremities of the cam teeth 29. When the collar 18 has been rotated sufficiently to enable the ratchet cam surface 27 and ratchet teeth 29 to provide the desired axial movement of the collar 18 with respect to the nipple 12, the detent ridges 36 will enter the detent grooves 34 to maintain the collar 18 in position against accidental counter rotation. However, such detent action may be overcome during intentional manual rotation of the collar 18 in order to enable the hose 30 to be easily and quickly disengaged from the nipple 12.

It will be understood that the rotation of the collar 18 will tend to produce some twisting of the hose 30. Since such twisting will be distributed over the length of the hose 30, this does not present a problem although it is desirable to design the coupling to require less than one full rotation in order to accomplish the desired seal and gripping action. More than two ratchet teeth and ratchet cam surfaces could be used about the periphery of the coupling. The ratchet teeth may be on the collar with the ratchet cam surfaces on the body 11 and vice versa. Similarly, the detent grooves may be on the ratchet teeth with the detent ridges on the ratchet cam surfaces and vice versa.

Actual embodiments of this invention have been made for use with both $\frac{3}{8}''$ and $\frac{1}{2}''$ tubing or hoses made of low density polyethylene and plasticized PVC (flex vinyl) materials having a wall thickness of about 0.040''. Bodies 11 of various kinds including male and female hose fittings, T-intersections, rigid pipe fittings, and fittings for interconnecting hoses of the same and different sizes have been cast of nylon material together with nipples 12 and collars 18 according to the teaching of this invention. It will be understood that the collars 18 are cast separately and subsequently assembled onto the nipples 12.

The shanks 14 of the nipples 12 have an exterior diameter about equal to the interior diameter of the hose to be coupled thereto. The heads 16 of the nipples 12 have a maximum diameter about 0.020 inch larger than the shanks 14 thereof and the collars 18 have an internal diameter about 0.020 inch larger than the maximum diameter of the heads 16 of the nipple 12 to which they are applied.

The shanks 14 of the nipples 12 have a length of about 0.345 inch and the collars 18 have an axial length of about 0.335 inch. The flanges 24 on the collars 18 have an internal diameter about 0.005 inch less than the maximum external diameter of the heads 16 of the nipples 12 to which they are applied.

It has been found that it is not necessary for the end of the hose 30 to seat against the flange 24 about its entire periphery in order to enable satisfactory operation of the coupling mechanism according to this invention. For example, it has been found that hoses cut at an angle to their axis resulting in a slanted end wall can be successfully coupled and sealed to a body using the mechanism of this invention provided that the cutting angle is not so large as to prevent the head 16 of the nipple 12 from being fully received within the hose.

It is necessary that the flange 24 be in compressive abutment with at least a portion of the periphery of the end of the hose 30 in order to provide satisfactory coupling according to this invention. However, the abutment member 24 could comprise one or more sectors rather than the continuous circular flange of the preferred embodiment of this invention.

It will be understood that the preferred embodiment of the coupling mechanism of this invention is suitable for use in pressurized systems with the relationship between the head 16 of the nipple 12 and the interior diameter of the collar 18 providing the primary sealing action and the relationship between the head 16 of the nipple 12 and the flange 24 of the collar 18 providing the primary gripping action. It is believed that those skilled in the art will make obvious modifications in the preferred embodiment of this invention as disclosed in the drawing and described herein to adapt applicant's teaching for various uses.

What is claimed is:
1. The combination of a coupling mechanism with a flexible hose of resilient material having an end portion of given wall thickness, said coupling mechanism comprising:

(a) a body having a nipple of rigid material projecting therefrom and received within said end portion of said hose, said nipple comprising a shank and a head, said shank having a right circular cylindrical exterior diameter substantially equal to the interior diameter of said end portion of said hose, said head having a maximum circular exterior diameter larger than said exterior diameter of said shank;

(b) a right circular cylindrical collar of rigid material surrounding said nipple and receiving said end portion of said hose, said collar having an interior diameter larger than said exterior diameter of said head of said nipple by an amount less than said given wall thickness of said end portion of said hose and an axial length shorter than the axial length of said shank of said nipple, said collar having an inwardly extending abutment member at one end thereof, said abutment member extending inwardly into close spaced relation less than said wall thickness of said end portion of said hose from said shank of said nipple, said collar being received on said nipple with said inwardly extending abutment member at the opposite end of said collar from said head of said nipple; and (c) means when rotated urging said collar to move axially of said nipple toward said head thereof, said means being adapted to selectively maintain said collar at a given point in its movement toward said head of said nipple, said inwardly extending abutment member applying axial compressive force to said end portion of said hose compressing said end portion of said hose axially and causing the side wall thickness of said end portion of said hose between said head of said nipple and said abutment member of said collar to expand radially into sealing and gripping contact with the exterior surfaces of said shank and said head of said nipple and with the interior surface of said collar at said given point in said movement of said collar.

2. The combination as claimed in claim 1 wherein said inwardly extending abutment member is a circular flange extending about the periphery of said collar at said one end thereof without interruption.

3. The combination as claimed in claim 1 wherein said head of said nipple includes a first conical surface tapering from a truncated apex at the free end thereof having a diameter smaller than said interior diameter of said hose to a base providing said maximum circular exterior diameter thereof and a second conical surface tapering from said base to a truncated apex coinciding with said exterior diameter of said shank, said first conical surface having a smaller apex angle than the apex angle of said second conical surface.

4. The combination as claimed in claim 1 wherein said means for urging said collar to move axially of said nipple toward said head thereof comprises a ratchet cam surface and a ratchet cam tooth, said collar being provided with one of said ratchet cam surface and said ratchet cam tooth and the other of said ratchet cam surface and said ratchet cam tooth being provided at the base of said shank of said nipple.

5. The combination as claimed in claim 4 wherein said collar is selectively maintained at a given point in the movement thereof by frictional forces inhibiting counter rotation of said collar with respect to said nipple.

6. The combination as claimed in claim 5 wherein said frictional forces inhibiting counter rotation of said collar with respect to said nipple are provided by engagement of a detent groove on one of said ratchet cam surface and said ratchet cam tooth with a detent ridge on the other of said ratchet cam surface and said ratchet cam tooth.

7. The combination as claimed in claim 1 wherein said means urging said collar to move axially of said nipple toward said head thereof comprises a pair of diametrically opposed ratchet cam surfaces at the base of said shank of said nipple and a pair of diametrically opposed ratchet cam teeth on said opposite end of said collar from said head of said nipple.

8. The combination as claimed in claim 7 wherein said pair of ratchet cam surfaces and said pair of ratchet cam teeth are shaped and dimensioned to provide full axial movement of said collar with respect to said nipple upon less than 180° rotation of said collar with respect to said nipple.

9. The combination as claimed in claim 8 wherein full axial movement of said collar with respect to said nipple toward said head of said nipple is provided by about 90° of rotation of said collar with respect to said nipple.

10. The combination as claimed in claim 9 wherein said body including said nipple and said ratchet cam surfaces are cast as a first integral unit of nylon material and said collar including said abutment member and said ratchet cam teeth are cast as a second integral unit of nylon material.

* * * * *